United States Patent [19]
Spinks

[11] Patent Number: 5,887,043
[45] Date of Patent: Mar. 23, 1999

[54] PASSIVE EMERGENCY WATER SYSTEM FOR WATER-COOLED NUCLEAR REACTORS

[75] Inventor: Norman J. Spinks, Deep River, Canada

[73] Assignee: Atomic Energy of Canada Limited Energie Atomique Du Canad, Ottawa, Canada

[21] Appl. No.: 885,356

[22] Filed: Jun. 30, 1997

Related U.S. Application Data

[63] Continuation-in-part of Ser. No. 538,477, Oct. 3, 1995, Pat. No. 5,661,770.

[51] Int. Cl.$^6$ .................................................. G21C 15/18
[52] U.S. Cl. .......................................... 376/298; 376/299
[58] Field of Search .................................. 376/293, 298, 376/299, 367

[56] References Cited

U.S. PATENT DOCUMENTS

| | | |
|---|---|---|
| 3,009,867 | 11/1961 | Kinsey . |
| 3,168,445 | 2/1965 | Ziegler . |
| 3,207,671 | 9/1965 | Kornbichler . |
| 3,423,286 | 1/1969 | Weems et al. . |
| 3,666,622 | 5/1972 | Schluderberg . |
| 3,929,567 | 12/1975 | Schabert et al. . |
| 3,937,651 | 2/1976 | Schabert et al. . |
| 3,984,282 | 10/1976 | Kleimola . |
| 4,050,983 | 9/1977 | Kleimola . |
| 4,131,509 | 12/1978 | Haidlen . |
| 4,210,614 | 7/1980 | Kleimola . |
| 4,666,661 | 5/1987 | Fredell et al. . |
| 4,687,626 | 8/1987 | Tong ........................................ 376/298 |
| 4,738,818 | 4/1988 | Cantineau ................................ 376/211 |
| 4,889,682 | 12/1989 | Gou et al. ................................ 376/298 |
| 4,948,554 | 8/1990 | Gou et al. ................................ 376/367 |
| 4,959,193 | 9/1990 | Hunsbedt et al. . |
| 5,049,353 | 9/1991 | Conway et al. . |
| 5,154,877 | 10/1992 | Schultz et al. . |
| 5,158,742 | 10/1992 | Dillmann . |
| 5,169,595 | 12/1992 | Cooke . |
| 5,190,720 | 3/1993 | Hunsbedt et al. . |
| 5,202,083 | 4/1993 | Spinks et al. . |
| 5,267,281 | 11/1993 | Gillett et al. . |
| 5,276,720 | 1/1994 | Oosterkamp et al. . |
| 5,282,230 | 1/1994 | Billig et al. .............................. 376/299 |
| 5,345,481 | 9/1994 | Oosterkamp . |

FOREIGN PATENT DOCUMENTS

| | | |
|---|---|---|
| 2150275 | 11/1996 | Canada . |
| 3035103 | 3/1982 | Germany . |
| 3518174 | 12/1986 | Germany ................................ 376/298 |
| 59-83086 | 5/1984 | Japan . |

OTHER PUBLICATIONS

W.P. Beck et al. "Candu Passive Heat Rejection Using the Moderator" International Conference on New Trends in Nuclear System Thermohydraulics, Pisa, May, 1994.

F.J. Erbacher et al., Passive Containment Cooling by Natural Air Convection for Next Generation Light Water Reactors. Nureth–5, Salt Lake City, 1992.

M. Gavrilas et al., "Gothic Coad Evaluation of Alternative Passive Containment Cooling Features" presented in Toronto, Oct. 21, 1994 at the Third International Conference on Containment Design and Operation.

(List continued on next page.)

*Primary Examiner*—Daniel D. Wasil
*Attorney, Agent, or Firm*—Emrich & Dithmar

[57] ABSTRACT

A passive emergency water system for cooling the atmosphere inside containment in a water-cooled nuclear reactor comprises an elevated in-containment water reservoir connected to an in-containment heat exchanger. The heat exchanger promotes natural convection of containment atmosphere and heat transfer. Heat from containment atmosphere is transferred to the reservoir by a convective return flowpath. The heat exchanger is preferably an elevated tube bank Baffle walls can be used inside containment to promote circulation of containment atmosphere. In one embodiment, the reservoir tank is closed with respect to containment atmosphere and is vented through the containment wall to the external atmosphere. In an alternative embodiment, the reservoir tank can be of a sufficient volume to absorb heat from containment as sensible heat without boiling.

18 Claims, 3 Drawing Sheets

OTHER PUBLICATIONS

H. Oikawa et al., "Heat Removal Passive Containment Cooling Systems During Loss of Coolant Accident", Journal of Nuclear Science and Technology, 28 10, pp. 907–920, Oct. 1991.

Y. Kataoka et al., "Experimental Study on Heat Removal Characteristics for Water Wall type Passive Containment Cooling System", ANP'92, Tokyo, Oct. 1992.

H. Nagasaka et al., "Study of a Natural–Circulation Boiling Water Reactor with Passive Safety", Nuclear Technology, vol. 92, pp. 260–268, Nov. 1990.

S.N. Tower et al., "Passive and Simplified System Features for the Advanced Westinghouse 600 MWe PWR", Nuclear Engineering and Design, 109 (1988), pp. 147–154.

Proc. Fifth International Conference on Emerging Nuclear Energy Systems, (ICENES'89), Karlstruhe, Germany, (1989), pp. 19–24, Hennies et al.

Abstract of a paper entitled Improving the Safety of Future CANDU Reactors by N. Spinks presented at an IAEA TCM in Vienna, May 29 Jun. 2, 1995, and copies of overheads of presentation made by N. Spiniks.

Copies of overheads of a presentation entitled Severe Accidents in CANDU Reactors: Design Directions and Programs by N. J. Spinks presented at IAEA TCM, Vienna, Oct. 1995.

PASSIVE EMERGENCY WATER SYSTEM FOR WATER-COOLED NUCLEAR REACTORS

RELATED APPLICATION

This application is a continuation-in-part of application Ser. No. 08/538,477, Oct. 3, 1995, now U.S. Pat. No. 5,661,770.

FIELD OF THE INVENTION

This invention relates to an improved system for passively cooling the atmosphere inside containment in a nuclear reactor in the event of a loss of coolant accident by convective heat transfer between containment atmosphere and an elevated water reservoir.

BACKGROUND OF THE INVENTION

Following an impairment in the normal cooling systems of nuclear reactors leading to a loss of cooling accident ("LOCA") and following shutdown of the fission chain reaction, there is a need to provide for rejection of residual heat, principally from the decay of fission products. For conventional water-cooled reactors, residual heat is rejected using pumps powered, in the absence of normal power supplies, by diesel generators. Redundancy is achieved with multiple trains of diesel generators and pumps, but reliability is limited by a lack of diversity in such an approach.

Modem designs of nuclear reactors avoid total reliance on active emergency cooling systems. A well engineered and well maintained passive system is thought to be more reliable than an active system.

Passive systems generally rely on natural convective forces to transport heat from inside to outside containment. Passive cooling measures promote the rate of heat transfer from the containment atmosphere to the containment walls. In such designs, the containment wall is usually made of steel in order to take advantage of its high thermal conductivity. However, other methods of promoting heat transfer to the containment wall are usually required. For example, in U.S. Pat. No. 5,049,353 issued Sep. 17, 1991 to Westinghouse Electric Corp., there is disclosed a reactor design in which containment cooling is effected by heat transfer through a steel containment vessel to the outside air flowing upwards by natural convection. The natural convection is enhanced by the use of an annular baffle about the containment wall and open at the top and bottom to improve airflow over the wall. The air-side heat transfer is augmented by the evaporation of water, which flows from an elevated tank and over the outside of the containment vessel against the up-flow of air.

Such designs that rely on flow past the containment wall to remove heat from the containment atmosphere are inherently inefficient in that the heat sink, being the reactor wall, is inefficiently distributed in elevation. Heat should be transferred from the containment atmosphere at the highest possible elevation to maximize natural circulation and heat transfer from containment gases. Another drawback with conventional designs is the poor heat transfer coefficient that is usually encountered with flow tangential to a surface, as would apply both inside and outside the containment wall. A related drawback is the limited surface area for heat transfer that is available in these designs.

It has also been proposed to use baffle walls inside containment to create a downward flow of air against the containment wall to improve heat transfer. However, the effectiveness of the use of an in-containment baffle wall to promote the passive circulation of containment atmosphere depends in large part on the architecture within containment. The proliferation of equipment and partitioned spaces within containment in the annular area between the baffle wall and the containment wall tends to interfere with the natural convective circulation. While the use of baffle walls greatly enhances convective circulation and heat transport to the containment wall, engineering and design considerations usually restrict their application to discrete locations about the periphery of the containment or require that equipment and partitions be placed in the annular flow area thereby disrupting the flow.

Given the requirement that nuclear reactors are required to be exceedingly structurally sound to withstand missile attacks and seismic events, an external concrete wall is imperative. Accordingly, conventional reactor designs using steel or other suitable metal having a high thermal conductivity to form the containment wall require two walls, an inner steel containment wall to ensure high levels of heat transfer and an outer concrete shielding wall.

Some designs augment the passive removal of heat by providing water reservoirs as a heat sink. For example, the Westinghouse AP600 reactor uses a water pool inside containment to condense steam from the RPV. However, while the in-containment pool cools the RPV, it does not cool containment atmosphere. Indeed, the in-containment pool is designed to boil and the heat must ultimately be transferred by containment atmosphere to the externally cooled containment walls.

Out-of-containment pools have been proposed for containment atmosphere cooling. In U.S. Pat. No. 5,276,720 issued Jan. 4,1994 to General Electric Company, there is described a boiling water reactor design including a passive containment atmosphere cooling system using an out-of-containment pool. A steam condenser is located in the pool. Steam from containment is applied to the tube side of the condenser and is condensed to limit the increase in pressure and maintain containment integrity. In a limiting accident, the external pool water is permitted to boil. The effectiveness of this system has certain inherent limitations. By placing the condenser inside the pool, the condenser size, and hence rate of heat transfer is limited, particularly when the water level of the pool boils down to low levels. In addition, the system is inherently limited in the volume of steam that can be delivered from containment, through lines to and from the remotely located condenser. In addition, venting of non-condensibles back to containment presents practical difficulties. Finally, the containment cooling effected by the condenser is not optimized to promote the natural convection of atmosphere within containment and therefore does not appreciably assist in heat removal to the containment walls.

SUMMARY OF THE INVENTION

It is an object of the present invention to provide an improved passive emergency water system for a nuclear reactor that maximizes heat transfer from containment and minimizes containment over-pressure.

In accordance with one aspect of the present invention, there is provided a system for cooling containment atmosphere in a nuclear reactor comprising an in-containment heat exchanger, an in-containment water reservoir elevated with respect to said heat exchanger, and a first return flowpath from said water reservoir through said heat exchanger and back to said water reservoir, said system effective to transfer heat from said containment atmosphere to said reservoir by convective flow in said first return flowpath, said system further including a baffle wall disposed in containment in spaced relation to the containment wall and being open at its upper end and having an aperture therethrough near its lower extremity, said baffle wall effective to promote natural convection of containment atmosphere in a downward direction in the space between said containment wall and said baffle wall and in an upward direction in the space interior of said baffle wall, said heat exchanger being disposed between said containment wall and said baffle wall at an elevation near said upper end of said baffle wall.

In accordance with another aspect of the present invention, the in-containment water reservoir is a tank which is closed with respect to containment atmosphere and is vented through the containment wall to the external atmosphere.

In accordance with another aspect of the present invention, the in-containment water reservoir is of a sufficient volume to absorb heat from containment as sensible heat without boiling.

In accordance with another aspect of the present invention, the heat exchanger is a tube bank located in an area effective to promote downward flow of containment atmosphere and having its tubes disposed transversely thereto.

In accordance with another aspect of the present invention, the heat exchanger is disposed near the uppermost limit of said downward flow of containment atmosphere.

In accordance with another aspect of the present invention, the reactor includes heat transport lines and further including means to depressurize the heat transport lines of said reactor by removing heat therefrom, said depressurizing means comprising a condenser in said water reservoir, a second return flowpath from said heat transport lines through said condenser and back to said heat transport lines, valve means for connecting said heat transport lines to said condenser through said second flowpath, said depressurizing means effective to transfer heat from said heat transport lines to said reservoir by convective flow in said second flowpath.

In accordance with another aspect of the present invention, the reactor is a heavy water moderated reactor having a moderator flowpath and further including moderator cooling means comprising a moderator heat exchanger connected to said reservoir by a second return flowpath from said water reservoir through said moderator heat exchanger and back to said water reservoir and to the moderator flowpath, said moderator cooling means effective to transfer heat from said moderator to said heat exchanger by convective flow in said moderator flowpath and from said heat exchanger to said reservoir by convective flow in said second return flowpath.

In accordance with another aspect of the present invention, there is provided a method of cooling containment atmosphere in a nuclear reactor by flowing containment atmosphere through an in-containment heat exchanger in fluid communication with an in-containment water reservoir elevated with respect to said heat exchanger by a first convective return flowpath from said water reservoir through said heat exchanger and back to said water reservoir, thereby transferring heat from said containment atmosphere to said reservoir, said method further including promoting said downwardly directed convective flow by providing a baffle wall disposed in containment in spaced relation inside the containment wall and being open at its upper end and having apertures therethrough near its lower extremity, and disposing said heat exchanger between said containment wall and said baffle wall at an elevation near the upper end of said baffle wall.

BRIEF DESCRIPTION OF THE DRAWINGS

The present invention will now be described with reference to the accompanying drawings, wherein.

DESCRIPTION OF THE PREFERRED EMBODIMENTS

Figure 1:
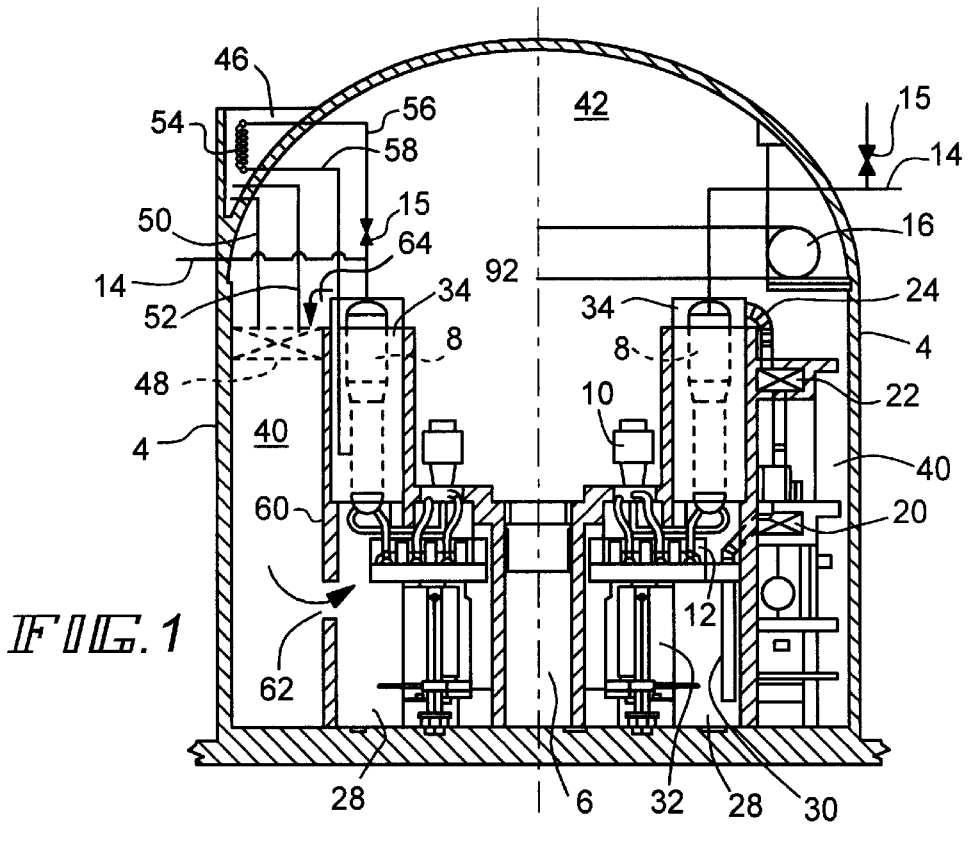
FIG.1 is a composite drawing of a CANDU reactor, showing an active CANDU design on the right half and the application of the passive emergency water system of the present invention to such a design in the left half.

Referring to the right half of FIG. 1, a CANDU reactor comprises generally containment shell 4, which encases a reactor core 6 and steam generator 8. In practice, a plurality of steam generators are used, however only one is shown in each half of FIG. 1 for clarity of illustration. Coolant from core 6 is circulated to steam generator 8 and back to core 6 by pump 10 through inlet and outlet headers generally designated by the numeral 12. Heat extracted from the coolant produces high pressure steam in steam generator 8 which is passed out through main steam line 14 to steam turbines (not shown).

Reserve water tank 16 of toroidal shape is positioned about the periphery of containment shell 4 at a high elevation. Water from tank 16 can be drawn upon to provide emergency cooling of the secondary side of steam generator 8.

Fan 20 draws containment gases through cooler 22 by duct 24 and discharges into reactor vault area 28 through duct 30. Fan 20 and cooler 22 are used to cool and circulate containment atmosphere in the event of a LOCA injecting large quantities of steam into containment.

The containment volume is comprised of an inaccessible area generally designated by numeral 32 which includes steam generator enclosure 34, reactor vault 28 and header area 12, an annular accessible area generally designated by numeral 40 which includes various machinery spaces including the areas about fan 20 and cooler 22, and a dome area generally designated by the numeral 42 which includes reserve water tank 16. During normal operations, the air inside the inaccessible area 32 is sealed off from the air which communicates between accessible area 40 and dome 42.

In practice, the most likely location of a large steam escape in a LOCA is in the area of headers 12 or in the large piping above such area. Steam escaping from headers 12 will rapidly fill and pressurize the inaccessible area. Steam generator enclosure 34 is provided with a blow-out panel or damper (not shown) at its upper end to permit steam and pressure to be released into dome area 42. Emergency cooling of containment atmosphere is initiated by fan 20 which draws air and steam from dome area 42 and the upper end of steam generator enclosure 34 through cooler 22 (which is fed by service water) and discharges the cooled gases into the reactor vault 28.

In addition, active steps are taken to depressurize the reactor coolant lines. Depressurization of the primary heat transport system is needed to facilitate injection of emergency coolant. This is achieved by opening main steam safety valve 15 venting main steam line 14 to atmosphere outside of containment thereby allowing stored water in the secondary side of steam generator 8 to be boiled off, drawing heat from and depressurizing the reactor coolant lines. Make-up water is gravity fed to the secondary side of steam generator 8 from elevated reserve water tank 16 to continue cooling of the primary reactor coolant lines. Loss of primary coolant from the break is compensated with high pressure emergency coolant injection (ECI) into the reactor coolant lines followed by pumped recovery of emergency coolant.

The above described conventional emergency measures to cool and depressurize containment atmosphere and the reactor core have significant drawbacks. Containment atmosphere cooling relies on service supplied cooler 22 and fan 20 which, because of their active nature, could be unavailable in the event of an interruption of supply services in an emergency. In addition, blowing down steam generator 8 by rapid venting to atmosphere outside of containment subjects the steam generator to substantial thermal and mechanical stresses which carries with it a risk of failure of a primary coolant line and a release of radioactive coolant to atmosphere.

Referring now to the left side of FIG. 1, a CANDU reactor having a passive emergency water system of the present invention is shown. Reserve water tank 46 is located outside of containment at a high elevation and is open to atmosphere. Heat exchanger tube bank 48 is located in the accessible area 40 at is upper end, but below the elevation of reserve tank 46. Tube bank 48 is connected to reserve tank 46 through inlet and outlet headers 50 and 52.

Main steam line 14 from steam generator 8 is connected to condenser 54 located in reserve water tank 46 through main steam safety valve 15 and feed and return lines 56 and 58.

Baffle wall 60 is provided with an aperture 62 at a low elevation to permit atmosphere to communicate between accessible area 40 and inaccessible area 32 below steam generator 8 and headers 12. Similarly, baffle wall 60 is open at its upper end 64 to permit atmosphere to communicate between accessible area 40 at its upper end, and the inaccessible area at the upper end of steam generator enclosure 34, and dome area 42. The apertures in baffle wall 60 can be sealed during normal operations by blow-out panels (not shown) to prevent circulation of air from the inaccessible to the accessible regions. In addition, the apertures can be configured to avoid line of sight exposure to radiation in the accessible area.

In the event of a LOCA, steam escaping from headers 12 will rapidly fill the region of reactor vault 28 and will rise up through steam generator enclosure 34 and into the inaccessible area 40 and dome area 42 via the blowout panels at the top of steam generator enclosure 34. After the initial blow-down of the heat transport system, a recirculating convective flow of containment gases will be set up. Cooling of the escaping steam will take place in the vicinity of the interior surface of the outer walls of the accessible area 40 and dome area 42. The cooled and denser steam and air mixture will descend in the annular area 40 over the surface of containment wall 4. The cooled gases pass through lower aperture 62 and mix with steam from the break at low elevation. The use of baffle wall 60 greatly promotes the natural convective circulation of containment atmosphere.

Heat transfer tube bank 48 is located at a high elevation in containment in an area effective to promote a well developed downward flow of and heat removal from containment atmosphere. Water from external reservoir tank 46 is supplied to tube bank 48 and returns to tank 46 through natural convection via vertical headers 50 and 52. Water reservoir 46 is sized to boil away in no less than three days. The number, size and spacing of the tubes in tube bank 48 can be selected to provide the heat transfer area required. A plurality of tube banks can be distributed at suitable available locations about the upper periphery of containment wall 4 and the available heat transfer area is virtually unlimited.

Figure 5:
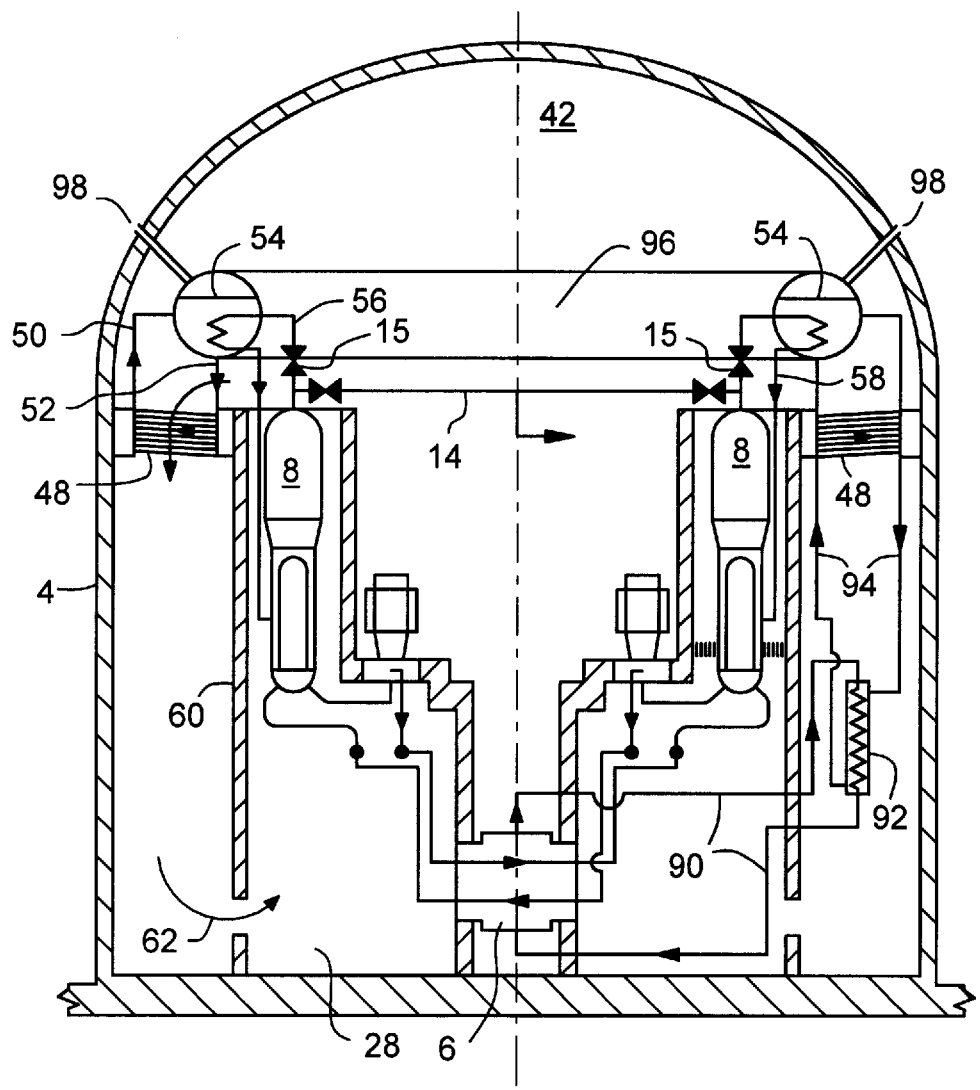
FIG.5 is a drawing of an alternative embodiment of the present invention employing an in-containment pool vented to external environment.

The tubes in tube bank 48 are preferably disposed in a direction generally transverse to the local convective flow in the area concerned in order to maximize heat transfer. When used in a vertically developed flow of containment atmosphere, such as is induced by the use of baffle wall 60 in FIG. 1, the tubes are preferably substantially horizontally disposed. In such a case, it is also preferable that the tubes be inclined slightly to the horizontal, so that there is a preferred convective flow direction for the water. The use of slightly inclined tubes in tube bank 48 is shown in FIG. 5.

The use of tube bank 48 has several important advantages. The positioning of the tube bank at a high elevation promotes a downward convective flow and heat transfer: heat should be transferred from the containment atmosphere at the highest possible elevation to maximize natural circulation and heat transfer coefficient. Designs which rely on heat transfer through steel containment walls inefficiently distribute much of the heat transfer surface at low elevations. The heat transfer coefficient across a tube bank is an order of magnitude larger than for flow tangential to a surface, as applies both inside and outside the containment wall. The use of conventional heat exchangers such as tube banks presents a relatively inexpensive solution to the heat transfer problem as compared to steel containment buildings, which are enormously expensive. The use of tube banks presents a relatively uncomplicated engineering solution. Heat transfer dynamics of conventional heat exchangers is well known. Tube banks offer flexibility in sizing and placement. A steel containment building presents a relatively difficult engineering solution and is limited in the amount of useable heat transfer area. By obviating the need for steel containment to effect heat transfer, the tube bank design of the present invention can be used in reactor designs employing single-wall concrete containment.

In an alternative embodiment of the present invention, elevated reservoir tank 46 can be used as a heat sink for emergency depressurization of the reactor coolant lines. As shown in FIG. 1, the main steam safety valve 15 can be positioned to vent steam from steam generator 8 to condenser 54 located in reservoir 46 via line 56 and returned to steam generator 8 through line 58. This has the advantage over the conventional practice in CANDU reactors of blowing down the steam generators by venting to atmosphere in that primary coolant from a break in a steam generator tube will not be permitted to escape to atmosphere, but will be contained in the closed condenser loop.

Reservoir pool 46 is sized to absorb heat from the reactor for a period of three days following a LOCA. In general, the reservoir pool has to absorb stored heat above 100° C. plus heat that continues to be generated for three days. For secondary-side accidents, such as a loss of feed water to the steam generator, the pool has to absorb stored heat plus decay heat. For a LOCA, some heat is removed by the ECI system. However, in the event of a LOCA with loss of ECI, reservoir pool 46 would have to absorb not only all the stored heat and all the decay heat, but also the heat from the zirconium/steam reaction. For the CANDU 3 and CANDU 9 reactors, the required sizes of reservoir tank 46 are about 900 $m^3$ and 2000 $m^3$ respectively.

Figure 2:
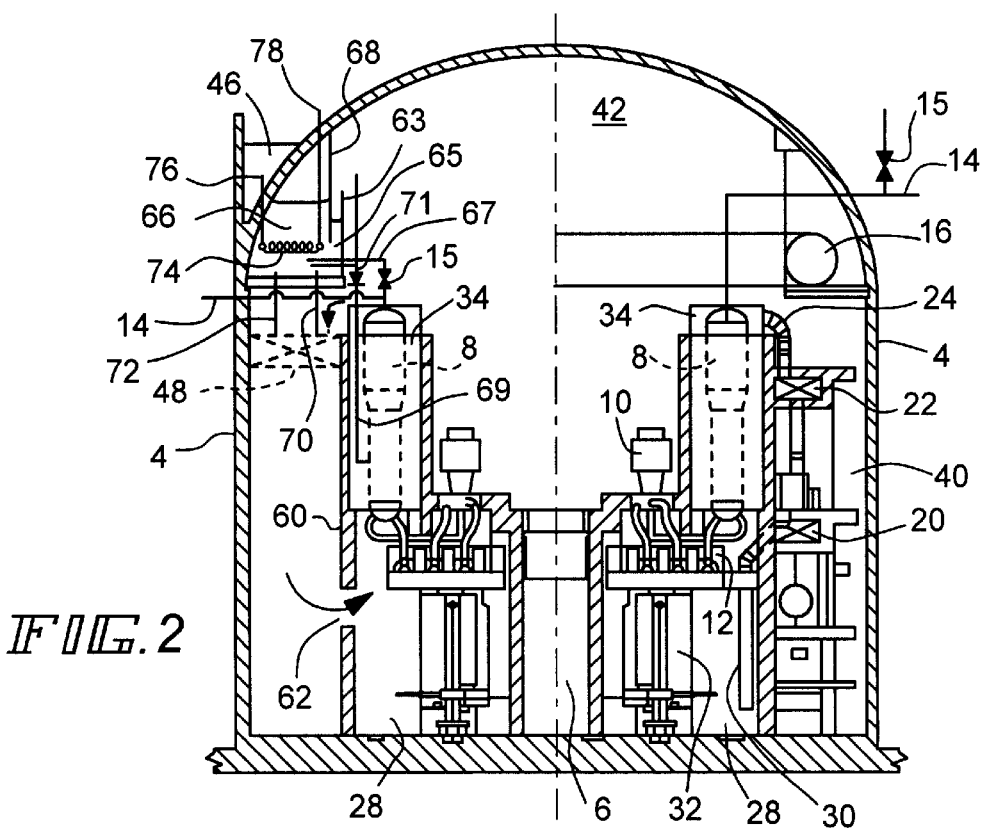
FIG.2 is a drawing of an alternative embodiment of the present invention employing a pressure suppression pool.

Referring to FIG. 2, there is shown in the left half an alternative embodiment of the present invention employing an in-containment pressure suppression pool. Pressure suppression pool 63 has volume 65 open to containment and volume 66 closed to containment via weir wall 68. Weir wall 68 is open at its bottom permitting communication between volume 65 and volume 66. Volume 66 of pressure suppression pool 63 is connected to tube bank 48 through inlet and outlet headers 70 and 72. Heat extracted from containment atmosphere flowing through tube bank 48 causes water to circulate by convective forces between tube bank 48 and volume 66 of suppression pool 63 through headers 70 and 72. Heat is removed from suppression pool 63 by heat exchanger 74. Heat exchanger 74 is connected at its inlet to reservoir 46 by line 76 and at its outlet to atmosphere through stand pipe 78. The generation of steam in heat exchanger 74 which passes out through stand pipe 78 effects heat removal.

Pressure suppression pool 63 has particular application for reactor designs which are susceptible to sudden increases in containment pressure during a major LOCA, such as reactors having a relatively small containment volume. Upon increase in pressure in containment, the level of water in volume 65 of pressure suppression pool 63 is forced down enabling steam and air to bubble under weir wall 68 and steam to be condensed in volume 66. Once the stored heat transferred from the steam generators is absorbed as sensible heat in suppression pool 63, long term decay heat extracted from containment atmosphere by tube bank 48 is removed by boiling of the water from external reservoir tank 46 in heat exchanger 74. For the CANDU 9 reactor design, the required size of pressure suppression pool 63 is about 1400 $m^3$.

In an alternative embodiment of the present invention, the main steam safety valve 15 can be positioned to vent steam from steam generator 8 directly into suppression pool 63 via line 67. After depressurization of steam generator 8, water from suppression pool 63 returns to steam generator 8 through line 69 and check valve 71.

Figure 3:
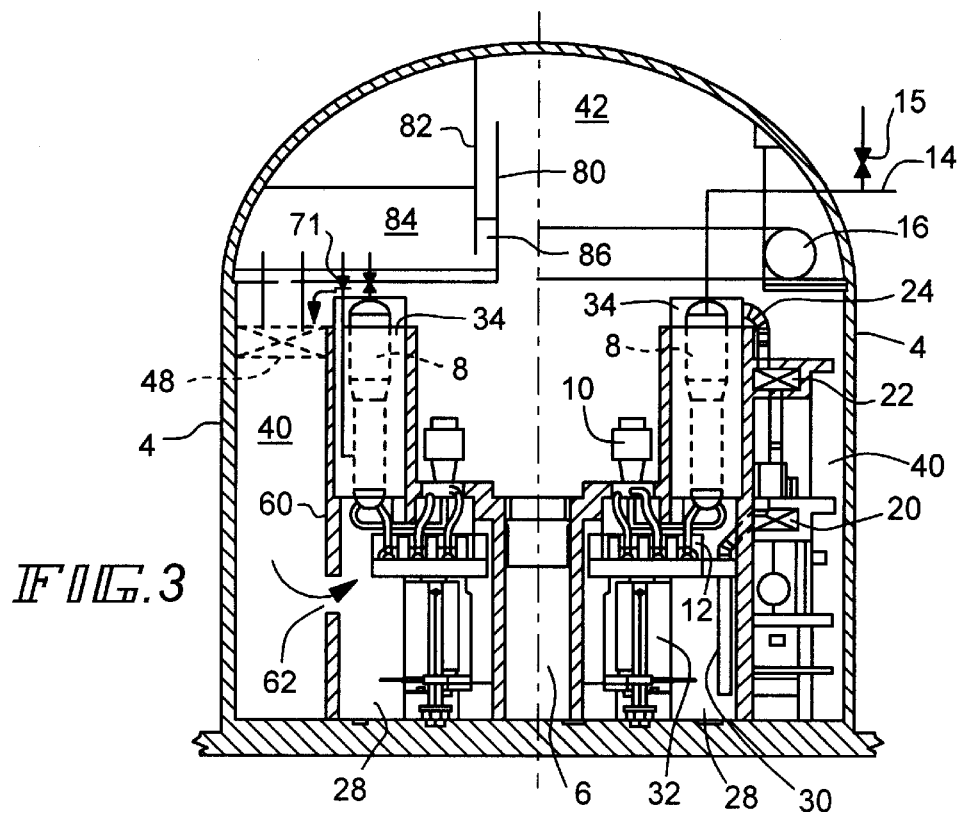
FIG.3 is a drawing of an alternative embodiment of the present invention employing a sensible heat in-containment pool.

Referring to FIG. 3, there is shown in the left half, an alternative embodiment of the present invention in which the reserve water tank is located within containment and stores heat as sensible heat. Reserve water tank 80 is configured as a pressure suppression pool with weir wall 82 separating volumes 84 and 86, and operates in the same manner as described with reference to FIG. 2. However, the reserve water tank of FIG. 3 is not connected in heat exchange relation with an external tank, but instead is of a sufficient volume to absorb heat in the event of a LOCA for three days without boiling. For the CANDU 3 and CANDU 9 reactors, the required in-containment sensible heat pool size is about 8,000 and 18,000 $m^3$ respectively. Such large masses of water at high elevation raise concerns about seismic events and civil design which must be addressed in considering such a design.

Figure 4:
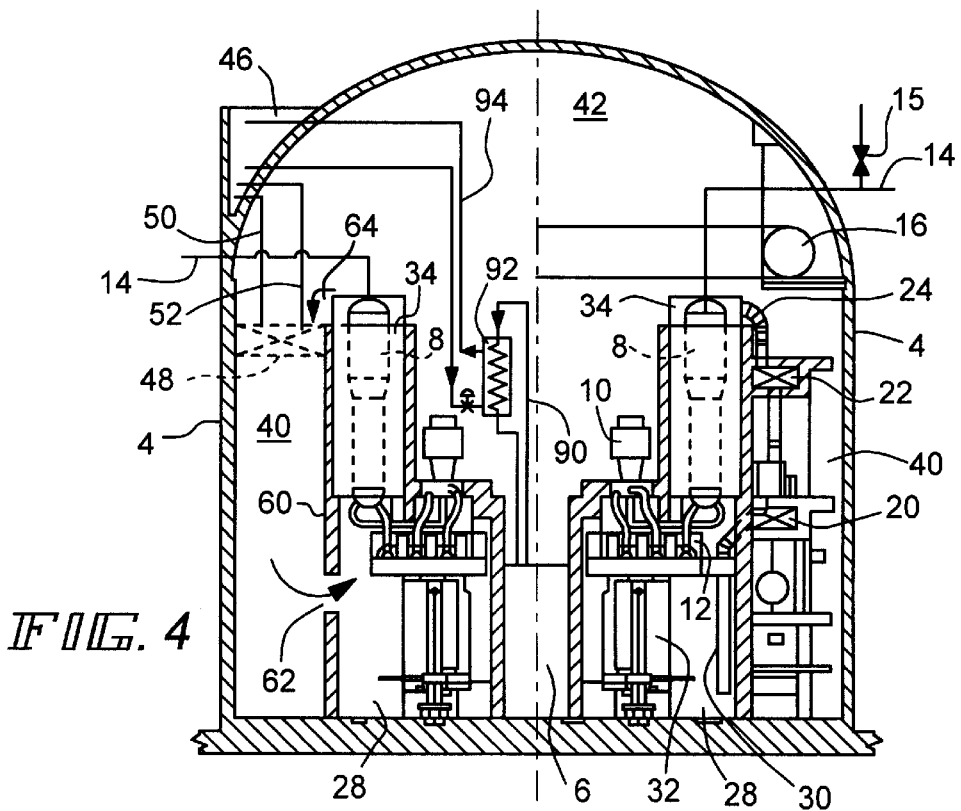
FIG.4 is a drawing of an alternative embodiment of the present invention employing moderator cooling.

In CANDU reactors, heavy water is used as a moderator in the reactor core. Following a LOCA coincident with loss of ECI, the heavy water moderator can act as a cooling system. Operating CANDU reactors use pumps for moderator heat rejection. In an alternative embodiment of the present invention shown in FIG. 4, the elevated reservoir tank 46 can also be used in heat exchange relation with a heavy water natural circulation loop 90 to remove heat from the reactor core. In such an embodiment a heat exchanger 92 can be configured to convectively circulate light water to and from the elevated reservoir in lines 94 in heat exchange relation with heavy water convectively circulated to and from the reactor core 6.

Referring to FIG. 5, there is shown an alternative embodiment of the present invention in which the reserve water tank is located within containment but is vented to the external environment. In this embodiment, reserve tank 96 is configured as a large toroidal vessel located near dome area 42 about the inside periphery of containment shell 4. Reserve tank 96 is vented to the external atmosphere by means of vent pipes 98. Heat exchanger tube bank 48 is positioned below the elevation of reserve tank 96 and is connected to reserve tank 96 through headers 50 and 52 in a similar manner to that described previously in respect of FIG.1. Main steam line 14 from steam generator 8 is connected to condenser 54 located in reserve tank 96 through main safety valve 15 and feed and return lines 56 and 58.

Internal reserve tank 96 functions in essentially the same manner as external reserve tank 46 as shown in the embodiment of FIG. 1, but offers a number of advantages. Space exists inside containment in the dome area in CANDU type reactors to house toroidal reserve tank 96. Thus, reserve tank 96 is more easily incorporated into the reactor design than external reserve tank 46 and is less vulnerable to missile attacks due to the protection of containment shell 4.

FIG. 5 also shows a moderator cooling arrangement. Light water convectively circulates from elevated reservoir 96 to moderator heat exchanger 92 and back through lines 94. Heavy water from reactor core 6 convectively circulates from reactor core 6 to moderator heat exchanger 92 and back through lines 90.

While the present invention has been described in association with the AECL CANDU pressurized heavy water reactor, it may be applied, with suitable modifications, to many other conventional reactor designs including pressurized light water reactors and boiling water reactors. In addition, while the in-containment tube bank is described in conjunction with a natural convective flow of containment atmosphere, it will be appreciated that provision can also be made for circulating containment atmosphere through the tube bank by active means when available.

We claim:

1. A system for cooling containment atmosphere in a nuclear reactor comprising an in-containment heat exchanger, an in-containment water reservoir elevated with respect to said heat exchanger, and a first return flowpath from said water reservoir through said heat exchanger and back to said water reservoir, said system effective to transfer heat from said containment atmosphere to said reservoir by convective flow in said first return flowpath, said system further including a baffle wall disposed in containment in spaced relation to the containment wall and being open at its upper end and having an aperture therethrough near its lower extremity, said baffle wall effective to promote natural convection of containment atmosphere in a downward direction in the space between said containment wall and said baffle wall and in an upward direction in the space interior of said baffle wall, said heat exchanger being disposed between said containment wall and said baffle wall at an elevation near said upper end of said baffle wall.

2. The system of claim 1 wherein said in-containment water reservoir is a tank which is closed with respect to containment atmosphere and is vented through the containment wall to the external atmosphere.

3. The system of claim 2 wherein said heat exchanger is a tube bank located in an area effective to promote downward flow of containment atmosphere and having its tubes disposed transversely thereto.

4. The system of claim 3 wherein the heat exchanger is disposed near the uppermost limit of said downward flow of containment atmosphere.

5. The system of claim 2 wherein said reactor includes heat transport lines and further including means to depressurize the heat transport lines of said reactor by removing heat therefrom, said depressurizing means comprising a condenser in said water reservoir, a second return flowpath from said heat transport lines through said condenser and back to said heat transport lines, valve means for connecting said heat transport lines to said condenser through said second flowpath, said depressurizing means effective to transfer heat from said heat transport lines to said reservoir by convective flow in said second flowpath.

6. The system of claim 2 wherein said reactor is a heavy water moderated reactor having a moderator flowpath and further including moderator cooling means comprising a moderator heat exchanger connected to said reservoir by a second return flowpath from said water reservoir through said moderator heat exchanger and back to said water reservoir and to the moderator flowpath, said moderator cooling means effective to transfer heat from said moderator to said heat exchanger by convective flow in said moderator flowpath and from said heat exchanger to said reservoir by convective flow in said second return flowpath.

7. The system of claim 1 wherein said in-containment water reservoir is of a sufficient volume to absorb heat from containment as sensible heat without boiling.

8. The system of claim 7 wherein said heat exchanger is a tube bank located in an area effective to promote downward flow of containment atmosphere and having its tubes disposed transversely thereto.

9. The system of claim 7 wherein the heat exchanger is disposed near the uppermost limit of said downward flow of containment atmosphere.

10. The system of claim 7 wherein said reactor includes heat transport lines and further including means to depressurize the heat transport lines of said reactor by removing heat therefrom, said depressurizing means comprising a condenser in said water reservoir, a second return flowpath from said heat transport lines through said condenser and back to said heat transport lines, valve means for connecting said heat transport lines to said condenser through said second flowpath, said depressurizing means effective to transfer heat from said heat transport lines to said reservoir by convective flow in said second flowpath.

11. The system of claim 7 wherein said reactor is a heavy water moderated reactor having a moderator flowpath and further including moderator cooling means comprising a moderator heat exchanger connected to said reservoir by a second return flowpath from said water reservoir through said moderator heat exchanger and back to said water reservoir and to the moderator flowpath, said moderator cooling means effective to transfer heat from said moderator to said heat exchanger by convective flow in said moderator flowpath and from said heat exchanger to said reservoir by convective flow in said second return flowpath.

12. A method of cooling containment atmosphere in a nuclear reactor by flowing containment atmosphere through an in-containment heat exchanger in fluid communication with an in-containment water reservoir elevated with respect to said heat exchanger by a first convective return flowpath from said water reservoir through said heat exchanger and back to said water reservoir, thereby transferring heat from said containment atmosphere to said reservoir, said method further including promoting said downwardly directed convective flow by providing a baffle wall disposed in containment in spaced relation inside the containment wall and being open at its upper end and having apertures therethrough near its lower extremity, and disposing said heat exchanger between said containment wall and said baffle wall at an elevation near the upper end of said baffle wall.

13. The method of claim 12 wherein said in-containment water reservoir is a tank which is closed with respect to containment atmosphere and is vented through the containment wall to the external atmosphere.

14. The method of claim 13 wherein said flowing of containment atmosphere through said heat exchanger is by downwardly directed convective flow.

15. The method of claim 13 comprising the additional step of depressurizing the heat transport lines of said reactor by transferring steam from said heat transport lines through a condenser located in said reservoir and back to said heat transport lines.

16. The method of claim 12 wherein said in-containment water reservoir is of a sufficient volume to absorb heat from containment as sensible heat without boiling.

17. The method of claim 16 wherein said flowing of containment atmosphere through said heat exchanger is by downwardly directed convective flow.

18. The method of claim 16 comprising the additional step of depressurizing the heat transport lines of said reactor by transferring steam from said heat transport lines through a condenser located in said reservoir and back to said heat transport lines.

* * * * *